United States Patent
Takahashi et al.

(10) Patent No.: US 6,712,593 B2
(45) Date of Patent: Mar. 30, 2004

(54) COMBINATION OF SPLIT BODIES FOR USE IN ASSEMBLING BLOWER FAN BY HOLLOW ARTICLE MOLDING PROCESS

(75) Inventors: Toshio Takahashi, Koganei (JP); Giichi Iida, Adachi-ku (JP)

(73) Assignee: Kioritz Corporation, Tokyo (JP)

( * ) Notice: Subject to any disclaimer, the term of this patent is extended or adjusted under 35 U.S.C. 154(b) by 246 days.

(21) Appl. No.: 09/985,411

(22) Filed: Nov. 2, 2001

(65) Prior Publication Data

US 2002/0051707 A1 May 2, 2002

(30) Foreign Application Priority Data

Nov. 2, 2000 (JP) ........................................ 2000-336111

(51) Int. Cl.[7] ............................................... B29C 45/14
(52) U.S. Cl. ..................... 425/112; 425/127; 425/129.1
(58) Field of Search ................................. 425/112, 121, 425/127, 129.1; 264/250

(56) References Cited

U.S. PATENT DOCUMENTS 5,026,265 A * 6/1991 Kanai et al. ................. 425/127
5,714,174 A * 2/1998 Kashiyama ................. 425/116

FOREIGN PATENT DOCUMENTS

| JP | 2-38377 B2 | 8/1990 |
| JP | 08-282740 | 1/1996 |
| JP | 11-138584 A | 5/1999 |

OTHER PUBLICATIONS

Nikkei Mechanical (May 2000, pp 122–127).
Nikkei Mechanical, pp 122–127, May 2000, english language abstract.

* cited by examiner

*Primary Examiner*—Timothy W. Heitbrink
(74) *Attorney, Agent, or Firm*—Nixon Peabody LLP; Donald R. Studebaker

(57) ABSTRACT

The present invention is directed to split bodies for assembling a synthetic resin blower fan by a hollow article molding process. The split bodies have a first split body which includes a circular base portion and vanes extending radially and a second split body assembled on top of said first split body and is in a doughnut-shaped cap with an air inlet at the center thereof. Air channels are formed between adjacent pair of the vanes. The second split body includes a plurality of grooves which are formed on an inner surface opposite from the first split body in an assembled state. Each of the grooves extends radially along an edge of a corresponding vane and is adapted to be closed by the edge so as to define a flow path for allowing a molten synthetic resin to pass therethrough. The second split body further includes an injection hole which is in fluid communication with an upstream end of the flow path with respect to the flow direction of the molten synthetic resin to be injected so as to allow the molten synthetic resin to be injected into the flow path therethrough.

5 Claims, 7 Drawing Sheets

COMBINATION OF SPLIT BODIES FOR USE IN ASSEMBLING BLOWER FAN BY HOLLOW ARTICLE MOLDING PROCESS

FIELD OF THE INVENTION

The present invention relates to a combination of split bodies for use in forming a synthetic resin blower fan by a so-called hollow article molding process. More specifically, the present invention relates to a combination of split bodies for use in forming a blower fan by the hollow article molding process. The blower fan includes a circular base, a doughnut-shaped cap having an air inlet at the center thereof, and radial blast-air channels formed between.

BACKGROUND OF THE INVENTION

Heretofore, an air blower has been used in various apparatuses such as operating machines including a power blower and a sprayer. The power blower includes a blower fan rotatably driven by any suitable drive unit such as a two-stroke internal combustion engine. Most of the conventional power blowers have a similar structure which includes a circular base, a doughnut-shaped cap having an air inlet at the center thereof, and a plurality of vanes radially extending therebetween. A radial blast-air channel is formed between a pair of the vanes adjacent to each other.

The cap of the conventional blower fan is typically screwed or riveted to bosses formed in a thickened wall portion of the vanes.

Generally, each configuration of the blast-air channel defined by the vanes determines a good part of the blowing performance of the blower fan. In a conventional structure, it is required to form the bosses in the vanes which causes to provide significant restrictions in design. In addition, an additional process is required, for example, to screw which results in undesirably increased labor and time in a manufacturing process.

As described in "Nikkei Mechanical" (May 2000, pp 122–127), Japanese Patent Publication No. Hei 2-038377, and Japanese Patent Laid-Open Publication No. Hei 11-138584, a hollow article molding process is known. The hollow article molding process disclosed in the above publications will be briefly described below.

Two split bodies to be united with each other are primarily molded with a molten synthetic resin by using a forming die. Then, without releasing the molded split bodies, the forming die is moved so as to couple the split bodies with each other. While the spilt bodies are kept at sufficiently high temperature, the coupled split bodies are secondarily molded by injecting and filling a molten synthetic resin in a space formed between respective coupled peripheral edges of the split bodies. Thus, by the melted peripheral edges because of the heat of the molten synthetic resin and, additionally, by the molten synthetic resin itself, the split bodies are fusedly bonded to each other. The term "hollow article molding process" herein means the process as described above.

The hollow article molding process may be classified, for example, into two processes; a DSI (Die Slide Injection) process and a DRI (Die Rotating Injection) process, depending on a motional direction of a forming die used in the molding. In the DSI process, after forming two split bodies as preliminary molded products, the forming die is opened with the preliminary molded products left within cavities thereof. Then, the forming die for the preliminary molded products is slid in a linear motion to couple the two split bodies with each other. According to the above-mentioned secondary molding process, the coupled split bodies are fusedly bonded with each other. In the DRI process, the forming die is rotated with two split bodies left within cavities thereof to couple the two split bodies with each other. Then, the above-mentioned molten synthetic resin is injected in a space formed between the coupled surfaces of the split bodies to fusedly bond the split bodies to each other. Irrespective of these motional directions of the forming die, the term "hollow article molding process" stated herein is intended to encompass any mode of the process defined as above.

SUMMARY OF THE INVENTION

It is an object of the present invention to provide a combination of split bodies which allow a blower fan to be assembled by a hollow article molding process.

In order to achieve the above object, the present invention provides a combination of split bodies for use in assembling a synthetic resin blower fan by a hollow article molding process. The split bodies comprises a first split body and a second split body assembled on top of the first split body, the first split body including a circular base portion and a plurality of vanes extending radially, the second split body being a doughnut-shaped cap with an air inlet at the center thereof, radial blast-air channels being formed between adjacent pair of the vanes, the second split body including a plurality of grooves which are formed on an inner surface opposite from the first split body in an assembled state and each of which extends radially along an edge of a corresponding vane, each of the groove being adapted to be closed by the edge so as to define a flow path for allowing a molten synthetic resin to pass therethrough, and the second split body further including an injection hole being in fluid communication with an upstream end of the flow path with respect to the flow direction of the molten synthetic resin to be injected so as to allow the molten synthetic resin to be injected into the flow path therethrough, and a gas vent hole being in fluid communication with the downstream end of the flow path with respect to the flow direction.

The split bodies according to the present invention are molded and bonded as follows. The first and second split bodies are primarily molded with a molten synthetic resin by using a forming die. Subsequently, the forming die is moved, leaving the first and second split bodies therewithin, so as to align each of the vanes of the first split body with the corresponding groove of the second split body in opposed relationship to each other and to bring them into contact with each other. This allows each of the grooves to be closed by the corresponding vane so as to define a flow path for a molten synthetic resin. In this state, the gas vent hole at the downstream end of the flow path is in fluid communication with another gas vent hole which is formed in the forming die and in communication with the atmosphere.

In this state, a molten synthetic resin is injected into the injection hole. This molten synthetic resin flows through the flow path toward the downstream thereof. The injected molten synthetic resin extrudes the air in the flow path through both the gas vent holes to the atmosphere. In the flow path, the molten synthetic resin makes contact with the inner wall surface of the groove and the wall surface of the edge of the vane, and thereby these wall surfaces are fused by the heat of the molten synthetic resin. Any gas generated by the melting synthetic resin forming both of the split bodies is also discharged through the gas vent holes to the atmosphere. When a sufficient quantity of the molten synthetic resin is injected to fill the flow path completely, the operation for injecting the molten synthetic resin is completed. Then, the molded blower fan is released from the forming die. Additionally, an operator may visually confirm whether the entire flow path has been filled with the molten synthetic resin by checking the presence of at least small quantity of the molten synthetic resin flowed out of the gas vent hole of the second split body.

The split bodies according to the present invention allow the blower fan to be integrally formed by an injection molding process, which provides a simplified manufacturing process. Further, each edge of the vanes is fusedly bonded with the second split body by the hollow article molding process. This eliminates the need for providing the boss formed in the vanes to mount the doughnut-shaped cap. Thus, the restrictions in designing the blast-air channels are significantly reduced, and a desirable blower fan structure can be designed freely in view of the above-mentioned performance of the blower fan.

Other features and advantages of the present invention will be apparent from the accompanying drawings and from the detailed description.

DESCRIPTION OF THE PREFERRED EMBODIMENT

Figure 1:
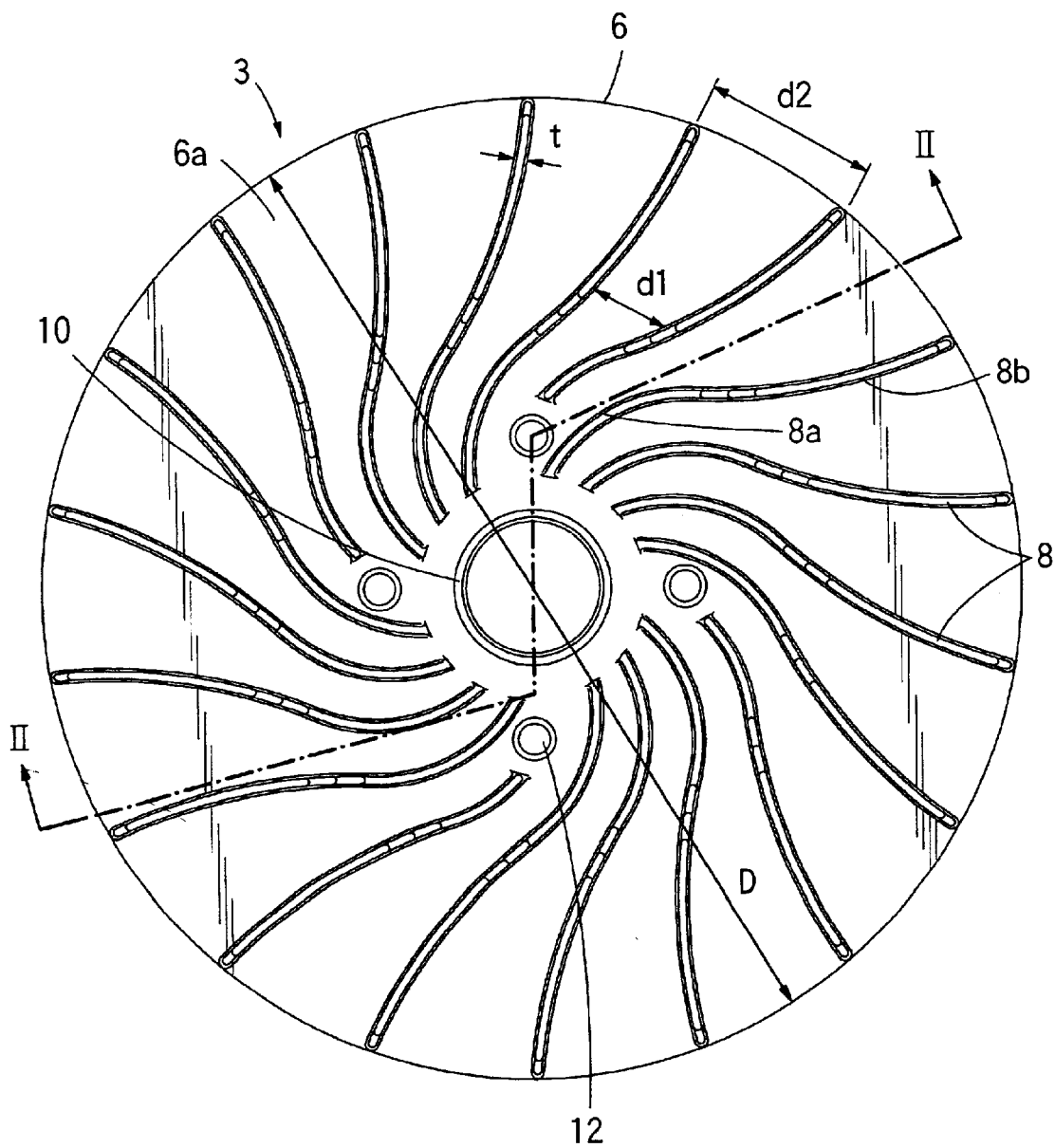
FIG. 1 is a front view of a first split body comprising a blower fan, according to an embodiment of the present invention.

With reference to the drawings, a preferred embodiment of a combination of split bodies for use in assembling by a hollow article molding process according to the present invention will now be described.

The split bodies 3, 4 according to the present invention are used in forming a blower fan 2 applicable to any air blowers such as sprayers for distributing a herbicide, fertilizer or the like, and power blowers for blowing dead leaves or the like. The blower fan 2 generally includes a plurality of vanes 8, each extending radially between a circular base 6 and a doughnut-shaped cap 4 having an air inlet 5 at the center thereof, and a radial air-blast channel P formed between a pair of the vanes 8 adjacent to each other.

The first split body 3 according to this embodiment will be described with reference to FIGS. 1 and 2. In the state where the first and second split bodies are assembled with each other (hereinafter, the "assembled state"), the first split body 3 includes the circular base 6 to be disposed on the side of a drive unit (not shown) for rotatably driving the blower fan and a plurality of vanes 8. The circular base 6 and the vanes 8 are integrally formed with a synthetic resin. A hub 10 is provided at the center of the circular base 6 to allow a shaft of the drive unit to pass therethrough. A suitable number of mounting holes 12 are formed around the hub 10 to attach the circular base 6 to the shaft of the drive unit with screws. As seen in FIG. 1, the vanes 8 extend radially on the upper surface 6a of the circular base 6, and each of the vanes 8 has a substantially uniform thickness "t".

Figure 2:
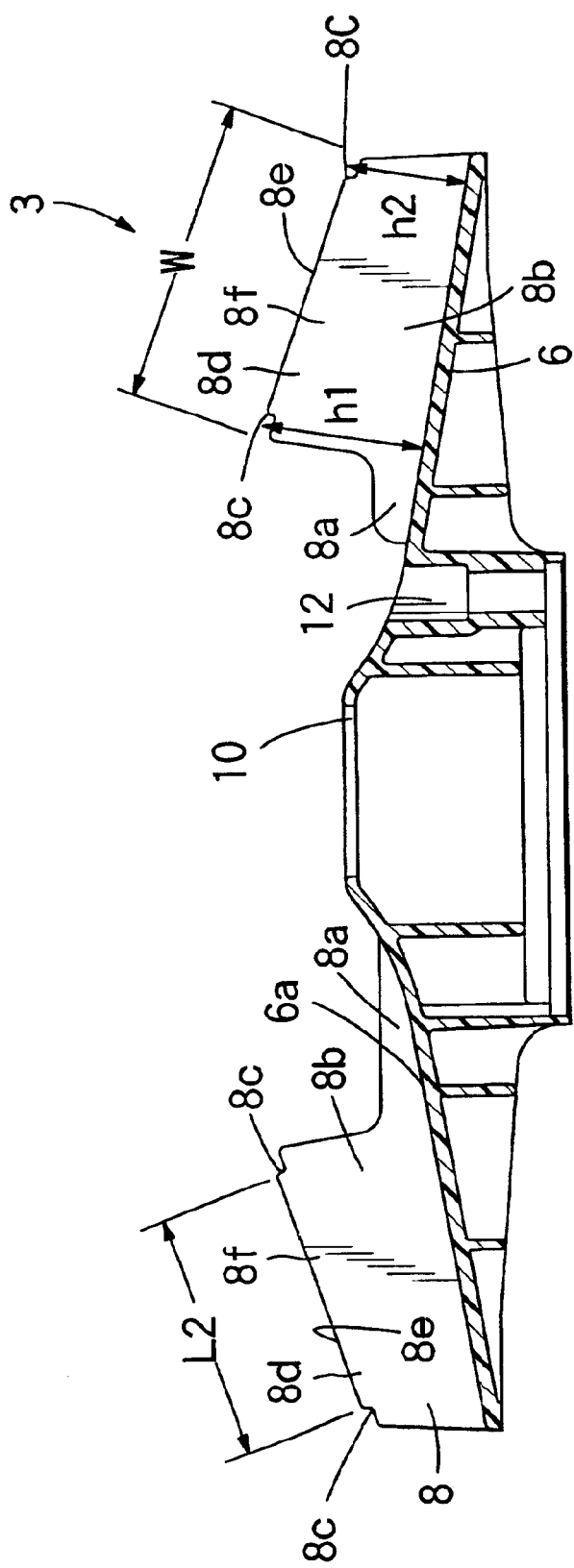
FIG. 2 is a sectional view of the first split body taken along the line II—II in FIG. 1.

As can be seen in FIG. 2, the upper surface 6a of the circular base 6 is inclined downward from the hub 10 in a radially outward direction. Each of the vanes 8 has a relatively low-height airflow deflecting region 8a provided on its radially inward side adjacent to the hub 10, and a relatively high-height channel forming region 8b which is integrally connected to the airflow deflecting region 8a on the radially outward side of the airflow deflecting region 8a. As described later, in the assembled state when the second split body 4, which serves as a cap, is attached to the first split body 3, an air inflow from the air inlet 5 provided at the center of the second split body 4 is deflected radially outward by the airflow deflecting regions 8a of the vanes 8. Further, a plurality of radially extending air-blast channels P are formed between the second split body 4 and each adjacent pair of the channel forming regions 8b of the vanes 8. The width W of the doughnut-shaped second split body 4 is equal to each length of the channel forming regions 8b of the vanes 8. Thus, in the assembled state, the doughnut-shaped second split body 4 covers the entire channel forming regions 8b to form the air-blast channels P.

In order to provide higher velocity of airflow, each of the air-blast channels P is required to have a smaller area at its radially outward outlet region than that at its radially inward inlet region adjacent to the air inlet 5. As seen in FIG. 1, each of the channel forming regions 8b extends in the radially outward direction of the circular base 6. Thus, regarding the distance between the adjacent pair of the channel forming regions 8b, the distance d2 in the radially outward outlet region is larger than the distance d1 in the radially inward inlet region. However, as shown in FIG. 2, the upper edge of the channel forming region 8b of the vane 8 slants in the radially outward direction at a larger angle than that of the upper surface 6a of the circular base 6, and whereby the height of the channel forming region 8b is reduced from h1 to h2. This provides an outlet area which is smaller than an inlet area in the assembled state.

Figure 3:
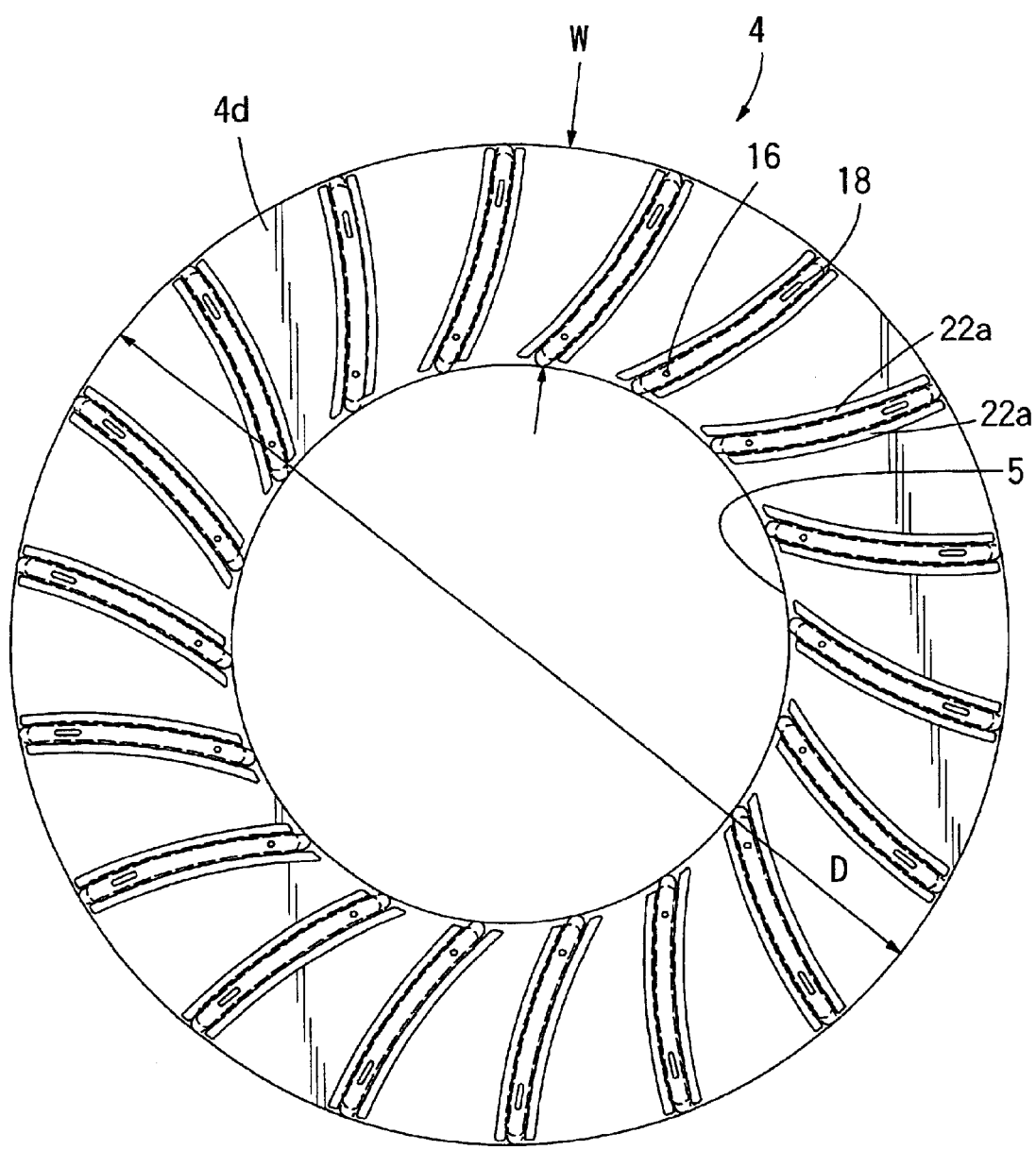
FIG. 3 is a front view of a second split body comprising the blower fan, according to an embodiment of the present invention.
Figure 4:
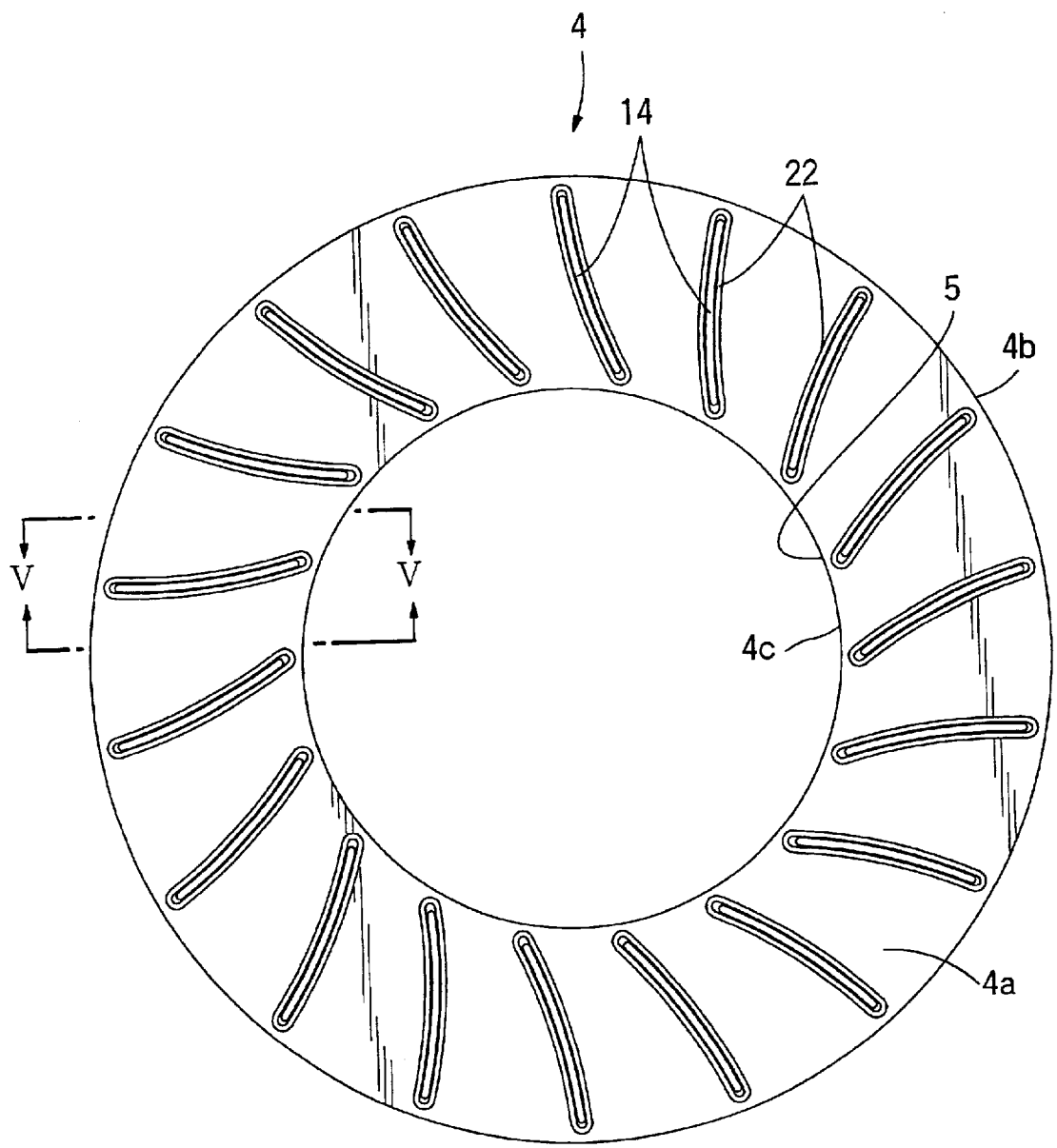
FIG. 4 is a rear view of the second split body.

The second split body 4 shown in FIGS. 3 and 4 which serves as a cap is attached onto the first split body 3 shown in FIG. 1. The second split body 4 has the same outer diameter D as that of the first split body 3. The second split body 4 has the air inlet 5 formed at the center thereof to constitute a doughnut shape. As with the first split body 3, the second split body 4 is made of a synthetic resin.

Figure 5:
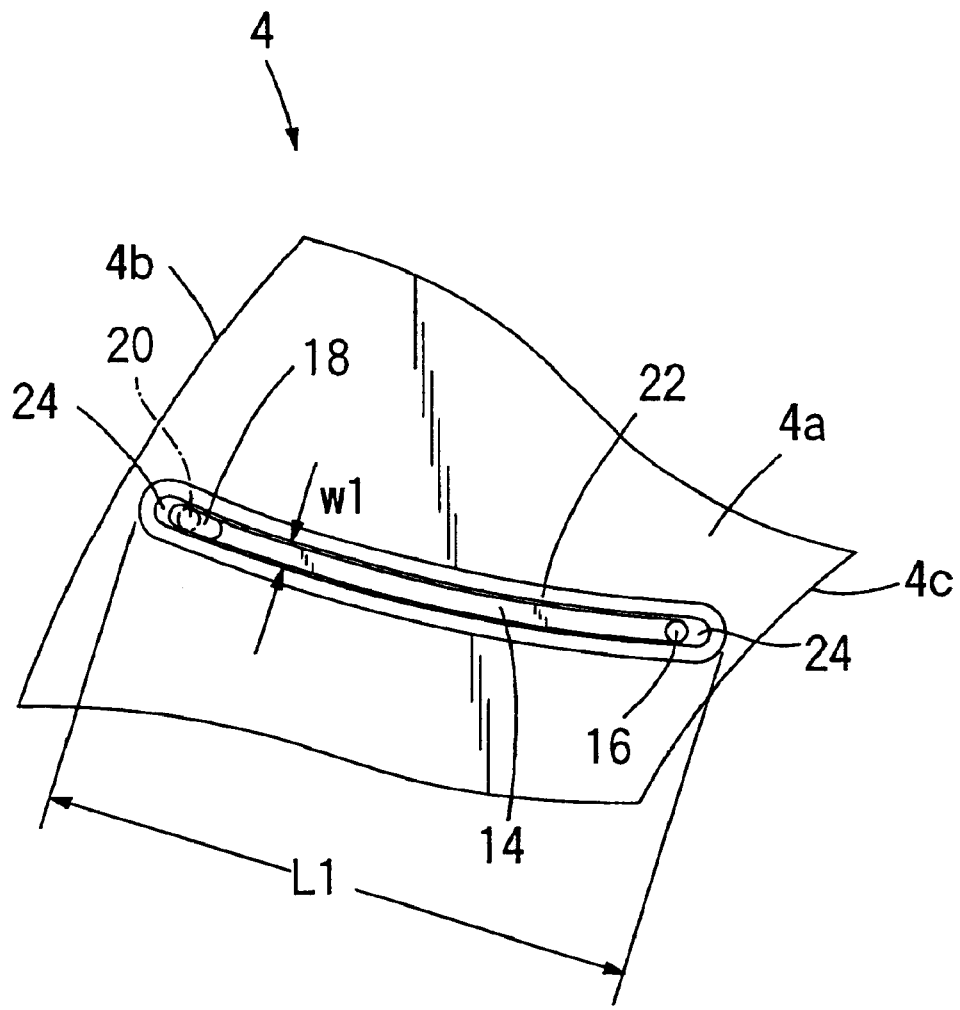
FIG. 5 is an enlarged view of the area surrounded by the line V—V in FIG. 4.

As seen in FIG. 4, the second split body 4 has a back surface or an inner surface 4a to be opposed to the first split body 3 in the assembled state, and a plurality of grooves 14 are formed on the inner surface 4a. Each of the grooves 14 is arranged to extend radially along the edge 8e of the channel forming region 8b of the corresponding vane 8 in the assembled state. Referring to FIG. 5 which is an enlarged view of the groove 14, an injection hole 16 is provided at one end or the radially inward end of the groove 14 to allow a molten synthetic resin to be injected therethrough so as to bond the first split body 3 integrally with the second split body 4. The details thereof will be described here-after. The same synthetic resin as the material of the first and second split bodies 3 and 4 is used as the molten synthetic resin to be injected through the injection hole 16. Further, a bonded-state checking window 18 is provided at the other end or the radially outward end of the groove 14 to check whether the molten synthetic resin injected into the groove 14 is fusedly and integrally bonded with the first split body 3 and the second split body 4. More specifically, if the molten synthetic resin is at a sufficiently high temperature, a part of a wall surface of the first and second split bodies 3 and 4, i.e. the part which forms a flow path F (see FIG. 7) of the molten synthetic resin defined by the edge 8e of the vane 8 and the groove 14, is fused by the heat from the molten synthetic resin, and whereby the first split body 3 is securely bonded to the second split body 4. When the molten synthetic resin is fusedly and integrally bonded with a inner preferential surface of the bonded-state checking window 18, it may be visually recognized that desirable bonding has also been achieved within the flow path F. In order to provide an improved visual checking with higher accuracy, the bonded-state checking window 18 is formed in an elongate elliptical shape along the longitudinal direction of the flow path F. As described in detail later, the radially downstream end of the bonded-state checking window 18 is also used as a gas vent hole in fluid communication with another gas vent hole 20 formed in a forming die (not shown). As seen in FIG. 3, each of the injection hole 16 and the bonded-state checking window 18 extends through from the inner surface of the groove 14 to the front surface 4d of the second split body 4.

Referring to FIG. 5, the inner surface 4a of the second split body 4 to be opposed to the first split body 3 is formed with an oblong dam 22 which protrudes from the inner surface 4a and continuously surrounds the edge region 8f of the vane 8 in the assembled state. As can be understood with reference to FIG. 2 again, a notch 8c is formed at each corner of the edge region 8f of the vane 8, and an insertion region 8d to be inserted into the dam 22 in the assembled state is defined in the vane 8 between the two notches 8c. As described later, the insertion region 8d is to be tightly received into the dam 22 so as to prevent undesirable leakage of the molten synthetic resin due to an injection pressure at the time of injecting the molten synthetic resin. That is, the dam 22 has an inner configuration complementary to an outer configuration of the insertion region 8d of the vane 8 so as to be tightly fitted into the dam 22. The width W1 and length L1 of the groove 14 are slightly smaller than the thickness t and length L2 of the insertion region 8d of the vane 8, respectively. As shown in FIG. 5, a step 24 is formed inside the dam 22 between the dam 22 and the groove 14 at each of the inward and outward ends of the dam 22. Each of the steps 24 is adapted to engage with the corresponding notch 8c in the edge region 8f to function as a stopper in the assembled state.

Figure 7:
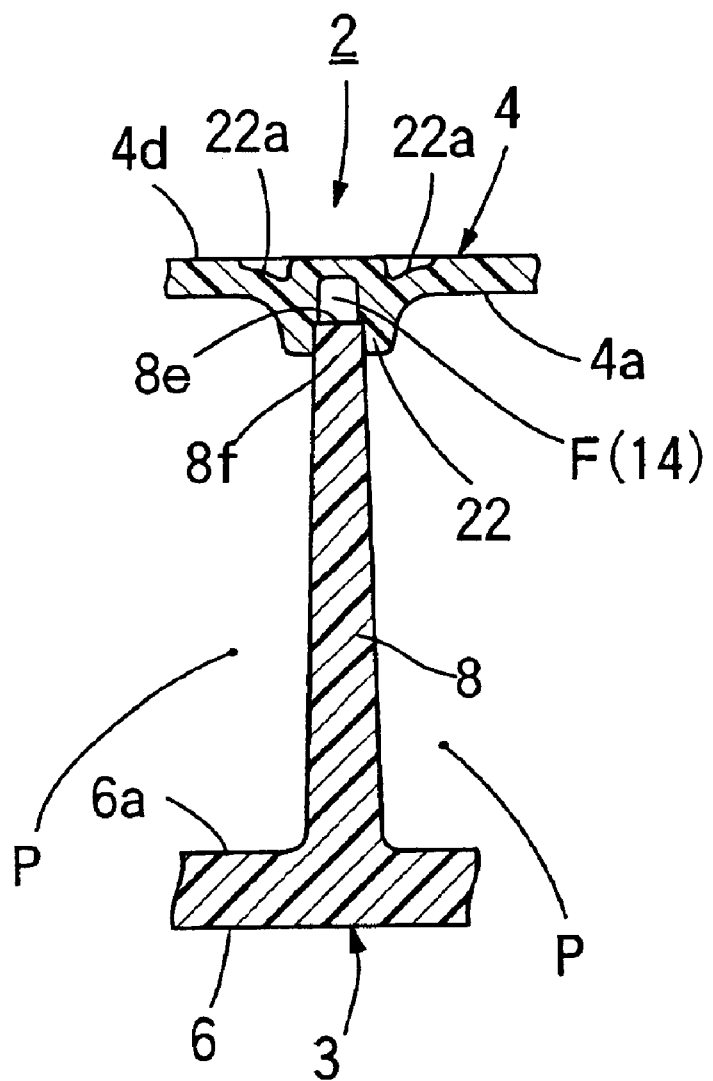
FIG. 7 is an enlarged cross-sectional view of the blower fan taken along the line VII—VII in FIG. 6.

As shown in FIGS. 3 and 7, for the purpose of enhancing moldability and reducing weight, a thinned-wall portion 22a is formed on the front surface 4d of the second split body 4.

Figure 6:
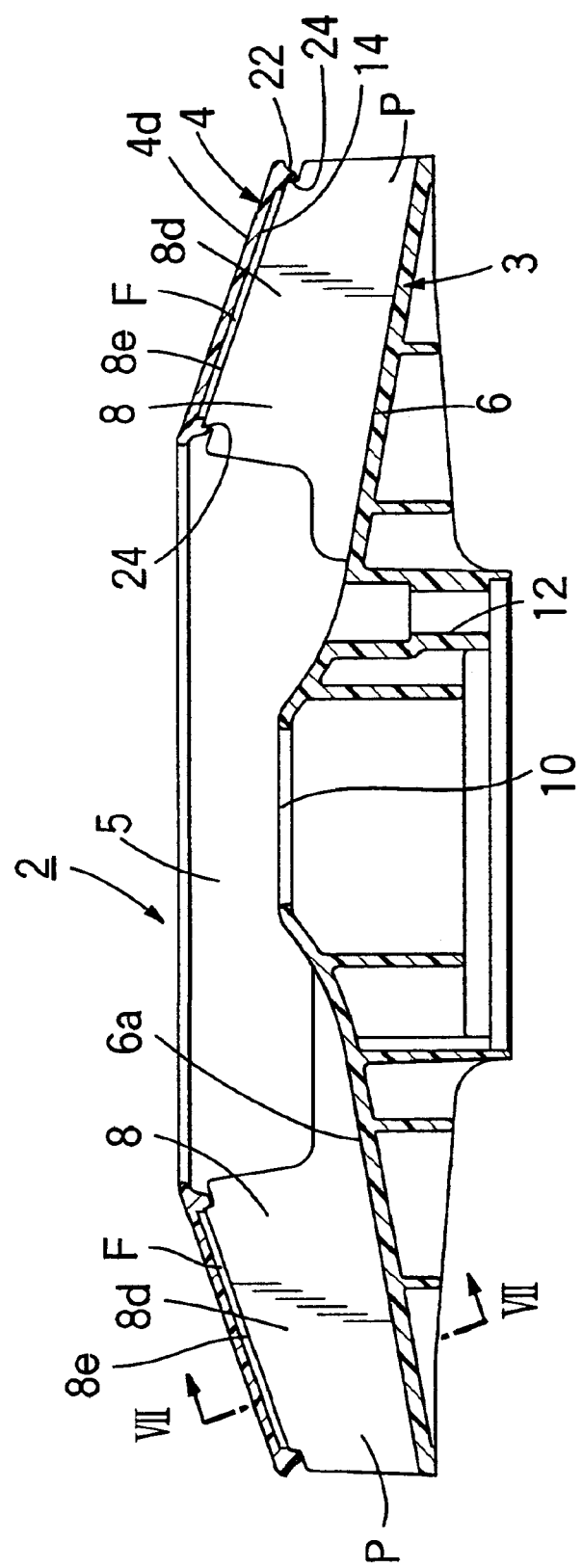
FIG. 6 is a diametrical sectional view of the blower fan in the state when the first and second split bodies are assembled.

As seen in FIGS. 6 and 7, once the insertion region 8d is inserted into the dam 22, the upper edge 8e of the edge region 8f makes contact with the steps 24, and whereby the groove 14 is closed by the upper edge 8e of the edge region 8f to define the flow path F for allowing the molten synthetic resin to be passed therethrough. The molten synthetic resin is injected from the injection holes 16 formed in the second split body 4. After releasing a molded product from the forming die, if some overflow of the synthetic resin through each of the bonded-state checking windows 18 is visually observed in the molded product, it means that the entire flow path F has been filled with the molten synthetic resin. When this molded product is cooled down, the first split body 3 is fusedly and integrally bonded with the second split body 4.

As described above, the first and second split bodies 3 and 4 are fusedly and integrally bonded by the molten synthetic resin injected into the groove 14. Thus, it is preferable that the groove 14 is formed as long as possible along the edge region 8f in the channel forming region 8b of the corresponding vane 8 in order to obtain structural strength. Preferably, the dam 22 is formed substantially over the entire width W from the outer edge 4b to the inner edge 4c of the second split body 4, and the groove 14 is formed substantially over the entire longitudinal internal area of the dam 22 forming the steps 24 inside the dam 22. Further, the insertion region 8d of the vane 8 is provided with the notches 8c so as to be the same length as the inner length of the dam 22. Furthermore, each corner of the upper edge of the insertion region 8d is slightly curved. Thus, when the insertion region 8d is inserted into the dam 22 and made contact with the step 24, a small gap is provided between the insertion region 8d and each wall surface of the step 24 and the dam 22.

The split bodies for the blower fan 2 according to this embodiment is produced and assembled into the blower fan 2 as follows.

In this embodiment, the split bodies are molded by the DSI process. While not shown, a forming die comprises a fixed die portion, a movable die portion, and a slidable die portion interposed therebetween. The slidable die portion is slidable between a predetermined upper position and a predetermined lower position by a power cylinder while keeping close contact with the surface of the fixed die portion. The movable die portion can be moved backward and forward by a die opening/closing device. In respective surfaces of the movable and slidable die portions opposed to each other, a female mold for the first split body 3 is formed in the upper side of the surface of the movable die portion, and a male mold for the first split body 3 is formed on the upper side of the surface of the slidable die portion. Further, a male mold for the second split body 4 is formed on the lower side of the surface of the movable die portion, and a female mold for the second split body 4 is formed in the lower side of the surface of the slidable die portion.

The slidable die portion is mated with the movable die portion at the predetermined lower position of the slidable die portion to primarily mold the first and second split bodies 3 and 4. Then, the movable die portion is moved backward so as to be away from the slidable die portion. Leaving the first and second split bodies 3 and 4 within the movable and slidable die portions, respectively, the slidable die portion is moved to a predetermined upper position by a power cylinder to align the second split body 4 in the slidable die portion with the first split body 3 in the movable die portion. The movable die portion is then moved forward or toward the slidable die portion, to bring the first split body 3 into contact with the second split body 4. In the course of this process, the edge region 8f of the vane 8 is inserted into the dam 22, and the upper edge 8e of the edge region 8f makes contact with the step 24 to close the groove 14 so as to define the flow path F of the molten synthetic resin in the groove 14. In this state, the bonded-state checking window 18 is covered by the slidable die portion except a part of the bonded-state checking window 18 at the most-downstream side in the flow direction of the molten synthetic resin which flows through the flow path F. That is, the slidable die portion has a cavity formed in a configuration corresponding to the doughnut shape of the second split body 4. The sliding die also includes a vent hole 20 provided at a position corresponding to the above-mentioned most-downstream region of the bonded-state checking window 18. The vent hole 20 serves as a die gas-vent hole opened to the atmosphere, while the most-downstream region of the bonded-state checking window 18 functions as a gas vent hole in fluid communication with the vent hole 20.

In this state, a molten synthetic resin which is the same material as that of the first and second split bodies 3 and 4 is injected through a gate into the injection hole 16 open to the flow path F by using an injection machine. The flow path F is filled with the molten synthetic resin in turn from the upstream side at which the injection hole 16 is provided. The injected molten synthetic resin flows toward the downstream side through the flow path F up to the downstream end at which the bonded-state checking window 18 is located. In this process, the molten synthetic resin also flows through the small gap formed between the curved surface of the edge region 8f of the vane 8 and each wall surface of the step 24 and the dam 22. The molten synthetic resin extrudes the air in the flow path F through the gas vent hole 20 to the atmosphere. The molten synthetic resin makes contact with each wall surface defining the flow path F, and whereby these wall surfaces are fused by the heat from the molten synthetic resin. Any gas arising from the melting synthetic resin of the wall surfaces is also discharged from the gas vent hole 20 to the atmosphere.

When a given quantity of the molten synthetic resin which is sufficient to fill the flow path F completely, or a certain quantity of the molten synthetic resin for filling up the flow path F, filling the bonded-state checking window 18, and causing a slight overflow from the gas vent hole 20, is injected, the injecting operation is completed.

Subsequently, the integrated blower fan 2 is released from the dies. Then, an operator visually checks whether the first and second split bodies 3 and 4 are fusedly and securely bonded with each other. The following two points are visually checked.

As a first point, it is checked whether the bonded-state checking window 18 is filled with the molten synthetic resin and it is fusedly and integrally bonded with the peripheral wall of the bonded-state checking window 18 to form a flat surface integral with the front surface 4d of the second split body 4. When adequately bonded, the molten synthetic resin is fused integrally with the front surface 4d of the second split body 4, and whereby the presence of the bonded-state checking window is hardly observed. If, for some reason, the molten synthetic resin at a relatively low temperature which is incapable of melting a part of the first and second split bodies 3 and 4 has been injected, the molten synthetic resin flowing into the bonded-state checking window 18 would not be integrated with the peripheral wall surface of the bonded-state checking window 18, and in such a case, the edge of the bonded-state checking window 18 can be clearly observed.

As a second point, it is checked whether at least small quantity of the molten synthetic resin has flown into the die gas-vent hole 20. Since the gas vent hole 20 is located at the most downstream side of the flow path F, even if only small quantity of synthetic resin flows out, it proves that the entire flow path F is filled with the molten synthetic resin. The quantity of the molten synthetic resin to be injected is controlled in advance to satisfy the requirement for filling up the entire flow path F. However, if the outflow of the molten synthetic resin into the gas vent hole 20 cannot be observed for some reason, it has high possibility that only a part of the flow path F is filled. In this case, desirable structural strength cannot be obtained due to insufficient bond with the vane 8.

Any unacceptable blower fans 2 in the above checking process will be excluded.

In this embodiment, the dam 22 is provided to surround the edge region 8f of the vane 8 in the assembled state. This prevents the molten synthetic resin from flowing out of the flow path F due to the injection pressure. Further, the second split body 4 can be readily positioned to the first split body 3 only by inserting the edge region 8f of the vane 8 into the dam 22.

Further, in this embodiment, the step 24 provided inside the dam 22 acts as a stopper when inserting the edge region 8f of the vane 8. This assures the formation of the flow path F with a predetermined depth. In addition, the molten synthetic resin injected in the flow path F also flows into the small gap between the dam 22, between the edge region 8f and the step 24. This can provide enhanced bonding strength after solidification. Since the dam 22 prevents undesirable leakage of the molten synthetic resin and the molten synthetic resin additionally flows into and fills up the small gap, the insertion region 8d of the vane 8 can avoid forcing high dimensional accuracy in configuration, which provides advantageous cost performance.

Further, in this embodiment, the dam 22 extends substantially over the entire width W in the radial direction of the doughnut-shaped second split body 4, and the groove 14 extends substantially over the entire internal area of the dam 22. Thus, the contact area between the edge region 8f of the vane 8 and the molten synthetic resin can be increased, and whereby the bonding strength can be enhanced.

Further, in this embodiment, the vane 8 extends substantially over the entire width W in the radial direction of the doughnut-shaped second split body 4, and the notches 8c are formed at both ends of the edge region 8f of the vane 8, so as to provide the narrow insertion region to be inserted into the dam 22. This allows the vane 8 to be maximized in length, which provides maximized performance of the blower fan 2.

Further, in this embodiment, providing the bonded-state checking window 18 allows the bonded state to be visually checked. In addition, since the bonded-state checking window 18 is formed in an elongate aperture in the longitudinal direction of the groove 14, the visual checking is facilitated.

Further, in this embodiment, the vane 8 is molded integrally with the circular base 6 which is driven by the rotational drive unit. This enables to assure sufficient strength against the force from the rotational drive unit. On the other hand, since the bonding is established between the cap 4 and the vane 8 on which no high external force is exerted, the blower fan 2 can obtain sufficient strength as a whole.

Further, in this embodiment, without forming the gas vent hole in the second split body 4 separately, the downstream end of the bonded-state checking window 18 is also used as the gas vent hole. This enables to simplify a forming die for the second split body 4.

It will be apparent to one skilled in the art that the present invention is not limited to the above embodiment, and various modifications may be made without departing from the scope of the invention. Accordingly, it is intended that such modifications should also be encompassed in the scope of the invention.

For example, while the molten synthetic resin used in this embodiment is the same material as that used for forming the first and second split bodies 3 and 4, it is not essential to use the same kind of material, and any suitable kind of synthetic resin which is capable of being fusedly and reliably bonded with the synthetic resin used for forming the first and second split bodies 3 and 4 may be used.

Further, the dam 22 is provided around the groove 14 in this embodiment. While this structure is preferable in view of preventing undesirable leakage of the molten synthetic resin and facilitating the positioning of the second split body 4 to the first split body 3, the dam 22 is not essential. If the groove 14 can be sealed by the edge region 8f of the vane 8 so as to define the flow path F, such a dam is not necessarily have to be provided. Alternatively, the upper edge 8e of the edge region 8f of the vane 8 may be formed with a raised portion capable of being fitted in the groove 14 and having a height shorter than the depth of the groove 14. Then, the groove 14 may be closed by fitting the raised portion therein to define the flow path F.

While this embodiment uses a part of the bonded-state checking window 18 as the gas vent hole, the gas vent hole may be provided independently of the bonded-state checking window 18. In this case, it is necessary for the gas vent hole to be formed in fluid communication with the downstream end of the flow path F. However, the bonded-state checking window 18 may be formed at any position along the flow path F.

Further, each position of the injection hole 16 and the gas vent hole in this embodiment may be reversed. Specifically, the injection hole 16 may be located at the radially outward side of the second split body 4, while the gas vent hole may be located at the radially inward side of the second split body 4.

In view of checking the bonded state, it is preferable to provide the bonded-state checking window 18 as in this embodiment. However, the bonded-state checking window 18 is not essential. In case of omitting the bonded-state checking window 18, the die gas-bent hole 20 may be formed at the downstream end of the flow path F.

As described above, the present invention can provide an improved combination of blower fan spilt bodies, which allows a desirable blower fan to be assembled through the hollow article molding process.

What is claimed is:

1. A combination of split bodies for use in assembling a synthetic resin blower fan by a hollow article molding process, said split bodies comprising:

a first split body and a second split body assembled on top of said first split body, said first split body including a circular base portion and a plurality of vanes extending radially, said second split body being a doughnut-shaped cap with an air inlet at the center thereof, radial blast-air channels being formed between adjacent pair of said vanes, said second split body including a plurality of grooves which are formed on an inner surface opposite from said first split body in an assembled state and each of which extends radially along an edge of a corresponding vane, each of said groove being adapted to be closed by said edge so as to define a flow path for allowing a molten synthetic resin to pass therethrough, and said second split body further including an injection hole being in fluid communication with an upstream end of said flow path with respect to the flow direction of the molten synthetic resin to be injected so as to allow the molten synthetic resin to be injected into said flow path therethrough, and a gas vent hole being in fluid communication with the downstream end of said flow path with respect to said flow direction.

2. A combination of split bodies as recited in claim 1, wherein said inner surface of said second split body which is opposite from said first split body in the assembled state is formed with a dam protruding from said inner surface so as to surround each of said vanes in the assembled state.

3. A combination of split bodies as recited in claim 2, wherein said second split body includes a step provided inside said dam between said dam and said groove, and said step is adapted to engage with a part of said edge of said vane in said assembled state.

4. A combination of split bodies as recited in claim 3, wherein said dam extends substantially over an entire width of said doughnut-shaped second split body in the radial direction, and said groove extends substantially over the entire internal area of said dam.

5. A combination of split bodies as recited any one of claims 1 to 4, wherein said second split body includes a bonded-state checking window for visually checking that the molten synthetic resin is injected up to the downstream end of said groove, said window being adapted to be in fluid communication with said flow path in said assembled state.

* * * * *